United States Patent [19]

Sakaguchi et al.

[11] Patent Number: 5,059,969
[45] Date of Patent: Oct. 22, 1991

[54] GPS SATELLITE SIGNAL TRACKING METHOD FOR GPS RECEIVERS

[75] Inventors: Shozaburo Sakaguchi; Hitoshi Ando, both of Saitama, Japan

[73] Assignee: Pioneer Electronic Corporation, Tokyo, Japan

[21] Appl. No.: 578,919

[22] Filed: Sep. 7, 1990

[30] Foreign Application Priority Data

Nov. 30, 1989 [JP]  Japan ................................ 1-308884

[51] Int. Cl.⁵ .......................... G01S 5/24; G01S 5/02
[52] U.S. Cl. .................................. 342/352; 342/357; 342/98; 342/420
[58] Field of Search .......... 342/357, 352, 358, 99–103, 342/417, 418, 420, 421, 444; 375/1; 364/443

[56] References Cited

U.S. PATENT DOCUMENTS

| | | | |
|---|---|---|---|
| 4,445,118 | 4/1984 | Taylor et al. | 342/357 |
| 4,701,934 | 10/1987 | Jasper | 375/1 |
| 4,785,463 | 11/1988 | Janc et al. | 375/1 |
| 4,837,700 | 6/1989 | Ando et al. | 364/449 |
| 4,890,233 | 12/1989 | Ando et al. | 364/457 |
| 4,924,402 | 5/1990 | Ando et al. | 364/449 |
| 4,983,980 | 1/1991 | Ando | 342/357 |

*Primary Examiner*—John B. Sotomayor
*Attorney, Agent, or Firm*—Sughrue, Mion, Zinn, Macpeak & Seas

[57] ABSTRACT

A method for recapturing a satellite at the highest elevation angle as quickly as possible with a GPS receiver having a plurality of receiving channels when a state of receiving satellite signals recovers to normal after having been interrupted by obstacles like a tunnel, wherein a search range of satellite signal receiving frequency is divided into a plurality of frequency bands and each of which is assigned to the plurality of receiving channels in a one-to-one relationship, a search frequency of each receiving channel is changed in step wise for searching a satellite signal simultaneously in the receiving channels, and further, by providing a time difference for a step wise change-over timing of the search frequency between receiving channels, a time required for recapturing the satellite is greatly reduced by increasing a change to lock up one of the receiving channels with the satellite signal receiving frequency, since there are as many chances as a number of receiving channels within one cycle of the step wise search frequency change-over for one receiving channel.

7 Claims, 4 Drawing Sheets

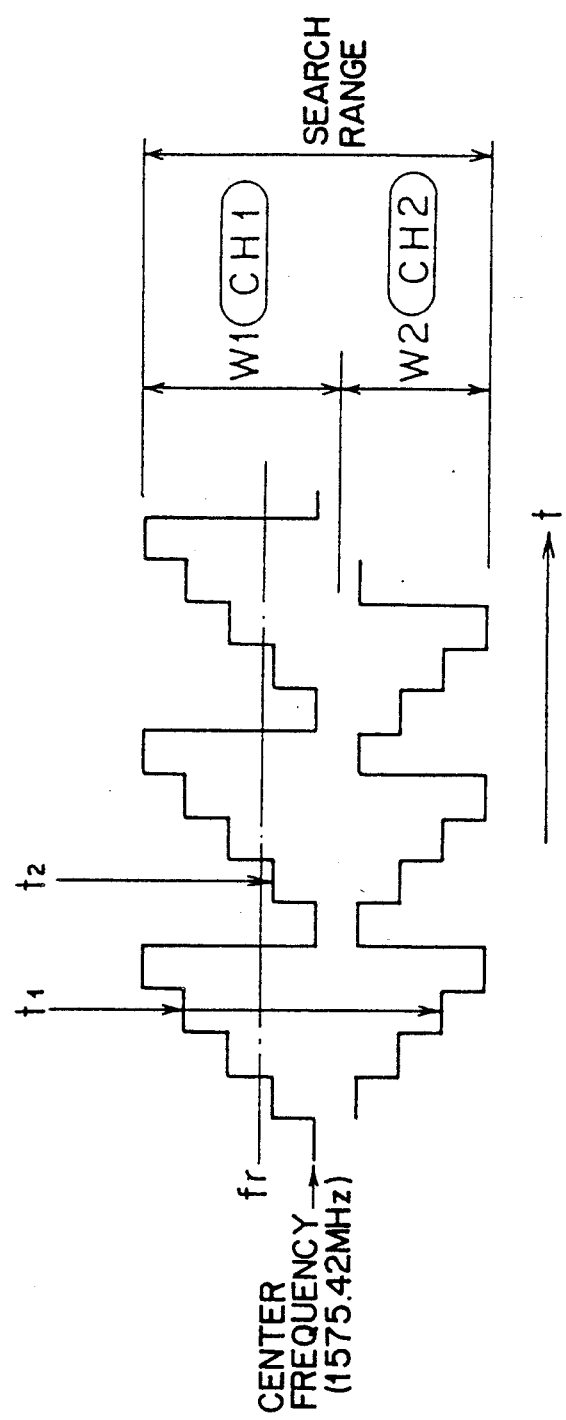

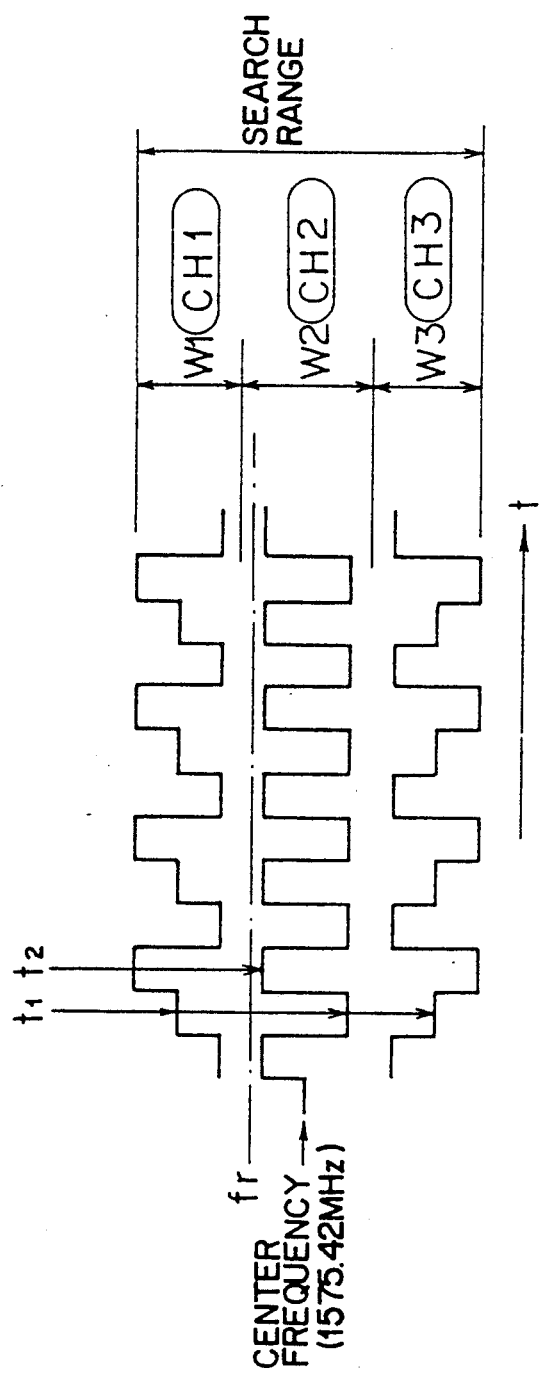

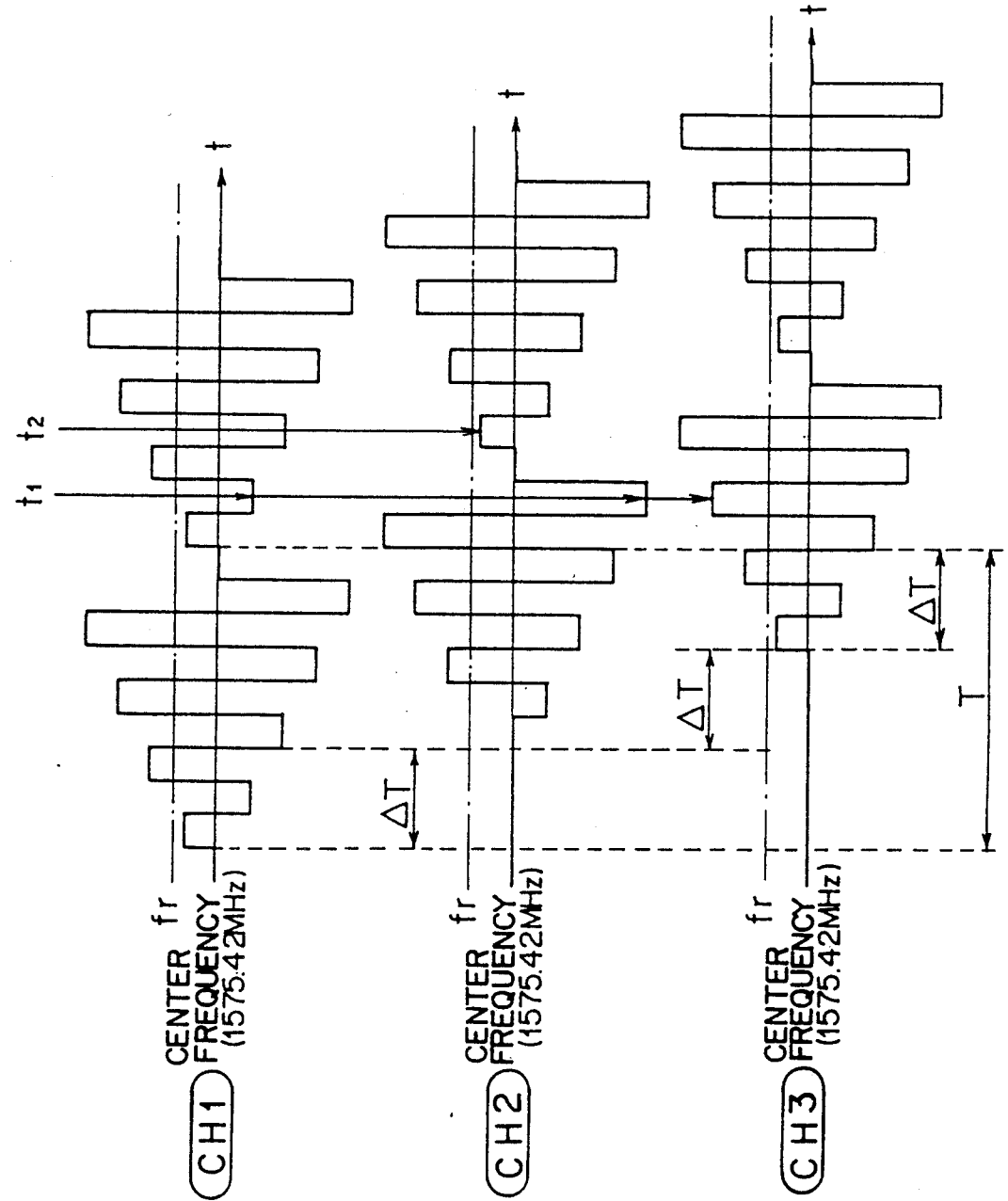

GPS SATELLITE SIGNAL TRACKING METHOD FOR GPS RECEIVERS

BACKGROUND OF THE INVENTION

1. Field of the Invention

The present invention relates to a method of tracking satellite signals for Global Positioning System (GPS) receivers.

2. Description of the Invention

Positioning systems currently in service utilizing artificial satellites include a so-called Global Positioning System (GPS). This positioning system, as the name implies, will cover the entire surface of the Globe by a total of 24 geodetic satellites when all of them are operational on six orbits, approximately 20,200 km above the Earth, which will accommodate four geodetic satellites each. Each geodetic satellite transmits a GPS signal containing navigation data for reckoning to the Earth using a spread-spectrum system. The reckoning is carried out on the ground, on the sea as well as in the air by receiving GPS signals from a plurality of geodetic satellites, for example, by receiving GPS signals from three geodetic satellites for two-dimensional positioning and that from four geodetic satellites for three-dimensional positioning. In this way, based upon the navigation data contained in the GPS signal from each geodetic satellite, position information on the receiving point such as a latitude, longitude and altitude thereof can be reckoned in real time.

This GPS system was originally developed for U.S. military use, however, a part of the GPS signal (C/A code) has been made available for civil use. Therefore, it is possible to build navigation systems for automobiles, ships and aircraft by using the GPS signal.

A GPS receiver used for a vehicle-mounted navigation equipment starts a search operation to recapture the GPS satellite when the vehicle enters a tunnel, for example, and the reception of the GPS signals from the GPS satellites is interrupted for more than a specified period of time (for example, one minute).

The GPS satellites are not geostationary, so that the satellite signal receiving frequency may be shifted by the Doppler effect. Therefore, as shown in FIG. 1, in order to search for satellite signals, it has been required to change a search frequency in succession over a maximum frequency range of the Doppler frequency shift being centered on a center frequency (1575.42 Mhz) of a satellite signal.

The satellite signals, as mentioned above, are transmitted by the spread-spectrum system. Therefore, the reception of the satellite signal must be initiated by locking a phased-lock loop (PLL) circuit of the GPS receiver on the exact receiving frequency of the satellite signal at every stepwise change-over of the search frequency. Upon successful locking of the PLL circuit, the spread-spectrum signal is despread to receive the GPS signal. This means that even when the satellite signal has arrived at the GPS receiver, it is not able to receive the GPS signal without any delay.

Referring to FIG. 1, for example, suppose the vehicle comes out of the tunnel at time t1 and that an actual receiving frequency of the satellite signal at that time is fr, the PLL circuit of the GPS receiver will lock on the receiving frequency fr at time t2, which corresponds to eighth stepwise search frequency change after the time t1, thus permitting the GPS receiver to recapture the GPS satellite.

Therefore, when the satellite signal is not received, the conventional GPS receiver cannot discriminate a difference between a state of no reception caused by the incompletion of locking the PLL circuit on the receiving frequency or the failure of despreading for the received signal and a state of no reception caused by the lack of satellite signals themselves as the vehicle enters a tunnel and the like. Because of this ambiguity, the conventional GPS receiver is not capable of dealing with the interruption of the receiving signal, such as when the vehicle is in the tunnel, in a proper way, so that it takes a considerable time for the GPS receiver to recapture the GPS satellite after the vehicle passing through the tunnel, causing a problem in positioning.

It is therefore an object of this invention to eliminate the above drawback and to provide a satellite signal tracking method for a vehicle-mounted GPS receiver having a plurality of receiving channels, through which a GPS satellite can be recaptured in the shortest possible time when the satellite signal returns to normal after the interruption has occurred by such an obstacle as tunnel.

SUMMARY OF THE INVENTION

The higher the angle of elevation of a satellite, the less likely the receiving signal is interrupted by obstacles such as buildings, trees and others which surround the GPS receiver and the better the sight to the GPS satellite from the ground. That is, as the angle of elevation increases, it becomes easier to chase the GPS satellite. When the reception of signals from satellites is interrupted for a certain period of time as when a vehicle enters a tunnel, the satellite signal tracking method of this invention decides that the mobile GPS receiver has entered a dead zone like a tunnel for signal reception. At this moment, the GPS receiver chooses, as a target, only one satellite that is estimated to have the maximum elevation angle, and attempts to recapture it.

According to this invention, there provided are two preferred methods of recapturing the GPS satellite. A first preferred method for recapturing the satellite at the highest elevation angle involves in dividing a search range of satellite signal receiving frequency into a plurality of bands, assigning these bands to the plurality of receiving channels in a one-to-one relationship, and changing the search frequency within the allocated frequency band for each receiving channel to search for a signal from the GPS satellite with the maximum elevation angle.

A second preferred method for recapturing the GPS satellite at the maximum elevation angle involves in dealing with a search for the satellite signal transmitted by assigning a specific time difference for step change-over timing of the search frequency in each receiving channel, and changing the search frequency of each receiving channel across the overall width of the search range for the receiving frequency of the satellite signal.

As to the first method, since the search range for the receiving frequency of the satellite signal is subdivided into a plurality of bands, which are then assigned to a plurality of channels on a one-to-one basis, the search range allocated to each channel is narrowed, and thereby reducing the time required for making a complete one round of search frequency change. Therefore, it is possible to reduce the time required for recapturing the GPS satellite to the extent that is reduced by the time taken in one round of the search frequency change.

In the second method, the search frequency in each receiving channel is varied across the overall width of the search range by giving a time difference to the step change-over timing of the search frequency for each receiving channel. Thus, when the vehicle carrying the GPS receiver comes out of the tunnel, even if a certain receiving channel fails to lock to the satellite signal, because of a slight difference in the step change-over timing, one of the remaining receiving channels which are given time differences from the failed receiving channel can be locked to the satellite signal before making another round of the search frequency change for the receiving channel which has failed to lock, thereby reducing the GPS satellite recapturing time.

BRIEF DESCRIPTION OF THE DRAWINGS

FIG. 2 is a time chart of a first embodiment of the invention showing a timing at which the search frequency is changed stepwise;

FIG. 3 is a time chart of a second embodiment of the invention showing a timing of changing the search frequency stepwise;

FIG. 4 is a time chart of a third embodiment of the invention showing a timing of changing the search frequency stepwise.

PREFERRED EMBODIMENTS OF THE INVENTION

Figure 1:
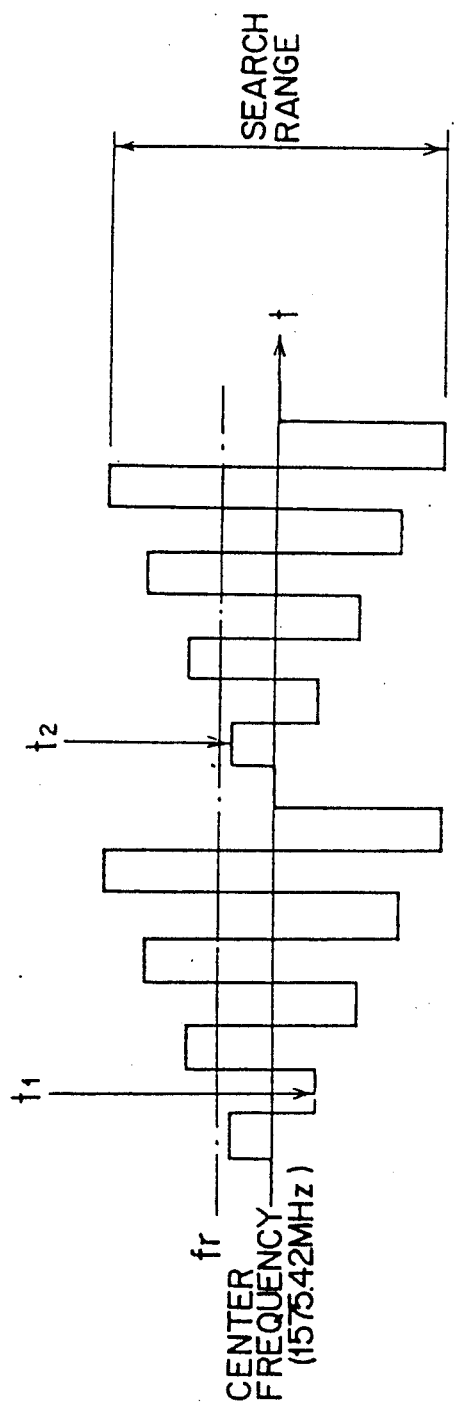
FIG. 1 is a time chart of step change-over for the search frequency performed by a conventional GPS receiver.

Preferred embodiments of this invention will now be described by referring to the accompanying drawings.

FIG. 2 is a time chart showing a change-over timing for the search frequency embodying the present invention.

This first embodiment has a first preferred satellite tracking method of this invention applied to a GPS receiver equipped with two receiving channels. In this embodiment, the search range of the satellite signal receiving frequency is divided into upper and lower frequency bands W1 and W2, whereby the upper frequency band W1 is assigned to a channel CH1 and that the lower frequency band W2 to a channel CH2, in order to carry out the simultaneous search for satellite signals in each channel.

When a vehicle carrying the GPS receiver enters a tunnel and there is no reception of signals from all GPS satellites for a specified period of time, for example, 1 minute, the GPS receiver is then brought into operation for searching GPS satellites in accordance with this invention, wherein a GPS satellite having the maximum angle of elevation is predicted at that moment. In order to predict the GPS satellite having the maximum elevation, there required is the following information for the GPS receiver:

(1) Clock information not too much deviated from the GPS clock (Clock deviation should be less than 10 minutes);
(2) Approximate position information not too much different from the actual position (If the position is within Japan, for example, the position of Tokyo may be appropriate); and
(3) Almanac information which can be used for estimating current position of each GPS satellite.

As for the clock information in item (1), the clock in the GPS receiver or the clock built into the vehicle can be used. Regarding the position information of item (2), coordinates such as the latitude and longitude of Tokyo, for example, may be stored in a ROM (Read Only Memory) installed in the GPS receiver. As for the almanac information of item (3), the almanac information of the GPS satellite that was received just before the signal became unreadable can be used. From these information, it is possible to predict the orbital positions of all GPS satellites by executing the known satellite orbit calculating algorithm, and thereby the GPS satellite which has the highest elevation angle is determined at that moment.

Upon predicting the GPS satellite at the maximum elevation angle in this way, the search operation to capture the predicted GPS satellite is initiated simultaneously through the two channels CH1 and CH2 of the GPS receiver.

Referring to FIG. 2, it is assumed that the vehicle comes of the tunnel at time t1 and that the actual reception frequency at that time of the GPS satellite which has the maximum elevation angle is fr, the search frequency in channel CH1 becomes a frequency that can be locked to the receiving frequency fr at time t2 which corresponds to the third step change-over of the search frequency after time t1. Hence, at this time t2, the PLL circuit of the channel CH1 is locked to the receiving frequency fr and the GPS satellite is recaptured.

On the other hand, in the conventional GPS receivers, the locking of a PLL circuit to the receiving frequency fr of the GPS satellite occurs at time t2, where is eighth step change-over of the search frequency after time t1 when the vehicle came out of the tunnel, as shown in FIG. 1. As it is apparent from the comparison between FIG. 2 and FIG. 1, the first embodiment of this invention is capable of recapturing the GPS satellite within one half of the time required by the conventional GPS receiver in terms of probability.

The positioning requires three or four GPS satellites and, once the GPS satellite at the maximum elevation angle is recaptured, the almanac information contained in the GPS signal from the GPS satellite can be used to determine the accurate current orbital positions of all other GPS satellites, thus making it extremely easy to locate other GPS satellites required for reckoning. Therefore, when the GPS satellite at the maximum elevation angle is successfully captured, the satellite search operation according to this invention is terminated and switched over to the normal reception mode whereby the signals from a plurality of GPS satellites are sequentially received in each channel.

FIG. 3 is a time chart showing a timing for changing the search frequency stepwise according to a second embodiment of the invention. The second embodiment is provided by applying the first GPS satellite recapturing method as described above to the GPS receiver having three receiving channels. The search range is divided into three frequency bands W1, W2 and W3, whereby the upper frequency band W1 is assigned to a channel 1, the middle frequency band W2 is assigned to a channel 2 and the lower frequency band W3 is assigned to a channel 3 for searching GPS satellites. Since the GPS satellite search operation is carried out in each of the three channels at the same time, according to the second embodiment of this invention, the GPS satellite can be recaptured within approximately one third of the time required for the conventional GPS receiver to locate the GPS satellite in terms of probability.

FIG. 4 is a time chart illustrating a timing for changing the search frequency stepwise according to a third embodiment of this invention.

The third embodiment of this invention is provided by applying the second GPS satellite recapturing method as described above to a GPS receiver having three receiving channels. In this embodiment, when one round of the step change-over for the search frequency in each channel CH1, CH2 or CH3 is designated by T, a time difference of $\Delta T$ ($=\frac{1}{3} \times T$) is given to the successive step change-over timing among the receiving channels CH1, CH2 and CH3 as shown in FIG. 4.

By providing the time difference of $\Delta T$ between the timings of the three receiving channels CH1, CH2 and CH3, the search frequency in each channels is successively changed stepwise across the overall width of the search range for the satellite signal in order to catch the satellite signal. Therefore, even if none of the receiving channels CH1 to CH3 was able to lock to the satellite signal receiving frequency at time t1 when, for example, the vehicle came out of the tunnel, the satellite signal can be locked by, at least, one of the three receiving channels, in the embodiment of FIG. 4, by the receiving channel CH2 at time t2 within $\Delta T$ from time t1.

In other words, as is clear from FIG. 4, the third embodiment can be reduced the time required for recapturing the GPS satellite to approximately one third of the time required by the conventional GPS receiver in terms of probability.

The advantages of this invention may be summarized as follows. When the reception of satellite signals returns to normal after having be rendered impossible as in a tunnel and the like, the tracking method in accordance with this invention allows the GPS receiver to quicken the recapturing of a GPS satellite at the maximum elevation angle which is of the easiest one to catch. This in turn enables the GPS receiver to restart the positioning immediately after the vehicle coming out of an obstacle.

The present invention is not to be considered to be limited to the specific embodiments illustrated, various modifications may be made to adapt a particular situation of material to the teachings of this invention without departing from the essential scope thereof as set forth in the appended claims.

What is claimed is:

1. A satellite signal tracking method for a GPS receiver having a plurality of receiving channels, comprising the steps of:
    selecting a GPS satellite, as a target, which is estimated to be at the maximum elevation angle when signals from all GPS satellites being tracked are interrupted for a specified period of time;
    dividing a search range of satellite signal receiving frequency into a plurality of frequency bands;
    assigning each of the divided frequency bands to each receiving channel; and
    changing a search frequency of each receiving channel respectively within the assigned frequency band in order to search for a signal from the GPS satellite at the maximum elevation angle.

2. A satellite signal tracking method as claimed in claim 1, wherein the search range is divided into an upper frequency band and a lower frequency band.

3. A satellite signal tracking method as claimed in claim 1, wherein the search range is divided into an upper frequency band, a middle frequency band and a lower frequency band.

4. A satellite signal tracking method as claimed in claim 1, wherein the search frequency is changed in a step wise fashion.

5. A satellite signal tracking method for a GPS receiver having a plurality of receiving channels comprising the steps of:
    selecting a GPS satellite, as a target, which is estimated to be at the maximum elevation angle when signals from all GPS satellites being tracked are interrupted for a specified period of time;
    dividing a search range of satellite signal receiving frequency into a plurality of frequency bands;
    assigning each of the divided frequency bands to each receiving channel;
    allotting a time difference to a step wise change-over timing of a search frequency between receiving channels; and
    changing the search frequency of each channel within the overall width of a search range of satellite signal receiving frequency in order to search for a signal from the GPS satellite at the maximum elevation angle.

6. A satellite signal tracking method as claimed in claim 5, wherein the search range is divided into an upper frequency band, a middle frequency band and a lower frequency band.

7. A satellite signal tracking method as claimed in claim 6, wherein the time difference is equal to one third of one period (T) of the step wise change-over.

* * * * *